(12) United States Patent
Straw et al.

(10) Patent No.: US 11,321,203 B1
(45) Date of Patent: May 3, 2022

(54) MERGED INFRASTRUCTURE FOR MANUFACTURING AND LIFECYCLE MANAGEMENT OF BOTH HARDWARE AND SOFTWARE

(71) Applicant: SoftIron Ltd., London (GB)

(72) Inventors: Phillip Edward Straw, Newark, CA (US); Robert Drury, Louth (GB); Alan Ott, Oviedo, FL (US); Bryan Larmore, Astatula, FL (US); David Patrick Anders, Hurst, TX (US); Stephen Hardwick, Austin, TX (US)

(73) Assignee: SoftIron Ltd.

( * ) Notice: Subject to any disclaimer, the term of this patent is extended or adjusted under 35 U.S.C. 154(b) by 0 days.

(21) Appl. No.: 17/067,274

(22) Filed: Oct. 9, 2020

(51) Int. Cl.
| | | |
|---|---|---|
| *G06F 11/00* | (2006.01) |
| *G06F 11/263* | (2006.01) |
| *G06F 11/22* | (2006.01) |
| *G06F 9/4401* | (2018.01) |
| *G06F 11/30* | (2006.01) |

(52) U.S. Cl.
CPC .......... *G06F 11/263* (2013.01); *G06F 9/4411* (2013.01); *G06F 11/2221* (2013.01); *G06F 11/3041* (2013.01); *G06F 11/3058* (2013.01)

(58) Field of Classification Search
CPC ............ G06F 11/1658; G06F 11/2028; G06F 11/203; G06F 11/263; G06F 11/3041
See application file for complete search history.

(56) References Cited

U.S. PATENT DOCUMENTS

| | | | |
|---|---|---|---|
| 2010/0165876 A1* | 7/2010 | Shukla ................ H04L 41/0856 370/254 |
| 2013/0014107 A1* | 1/2013 | Kirchhofer ........... G06F 9/5083 718/1 |
| 2015/0234644 A1* | 8/2015 | Ramanathan ....... H04L 41/5045 709/226 |
| 2020/0204436 A1* | 6/2020 | Brown ................ G07F 17/3262 |

* cited by examiner

*Primary Examiner* — Charles Ehne
(74) *Attorney, Agent, or Firm* — Van Pelt, Yi & James LLP

(57) ABSTRACT

A merged infrastructure for manufacturing and lifecycle management of both hardware and software is disclosed. In various embodiments, a library comprising a superset of device drivers is stored, the superset including for each of a plurality of supported systems a corresponding set of device drivers for devices comprising that supported system. A context in which a processor is deployed is determined, the context being associated with a specific corresponding one of the plurality of supported systems. The library is used to provision based on the determined context at least a subset of devices accessible by the processor in the context in which the processor is deployed.

17 Claims, 9 Drawing Sheets

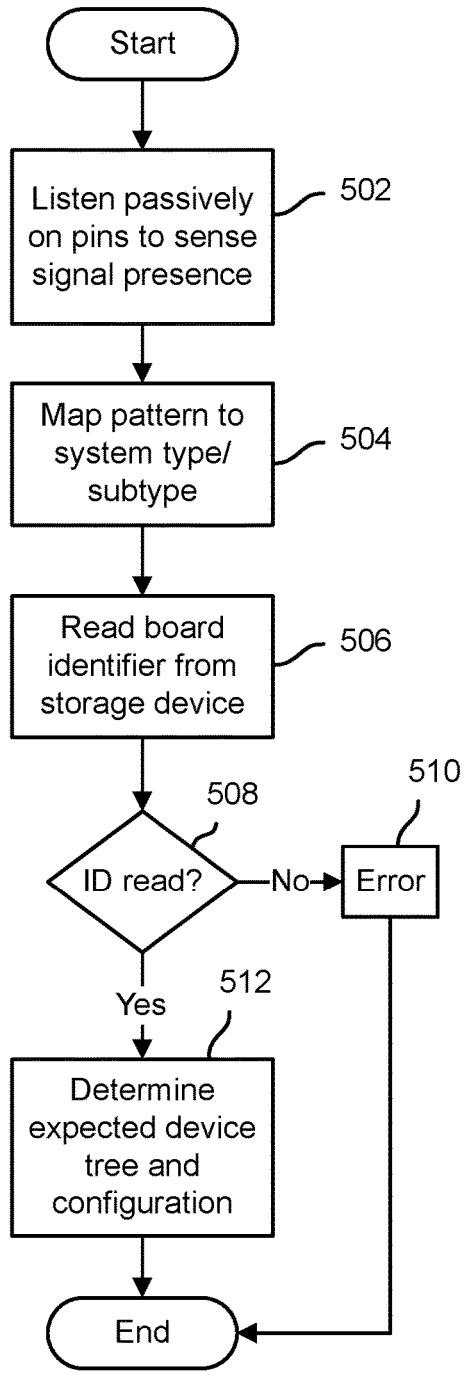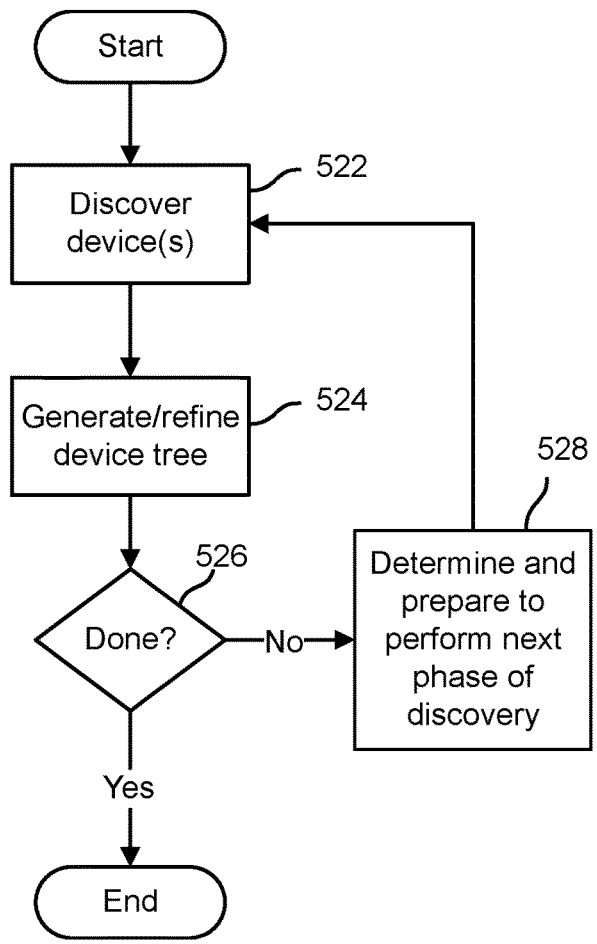
FIG. 5A
FIG. 5B

MERGED INFRASTRUCTURE FOR MANUFACTURING AND LIFECYCLE MANAGEMENT OF BOTH HARDWARE AND SOFTWARE

BACKGROUND OF THE INVENTION

A baseboard management controller (BMC) is a specialized service processor that monitors the physical state of a computer, network server or other hardware device using sensors and communicating with the system administrator through an independent connection. The BMC is part of the Intelligent Platform Management Interface (IPMI) and is usually contained in the motherboard or other main circuit board of the device to be monitored.

The BMC may be used to perform tasks that an administrator would otherwise need to physically visit the device, e.g., a server, to accomplish. Some of the more common use cases are power cycling a server and monitoring fan speeds/component temperatures, and hardware failures.

The sensors of a BMC measure internal physical variables such as temperature, humidity, power-supply voltage, fan speeds, communications parameters and operating system (OS) functions. If any of these variables happens to stray outside specified limits, the administrator is notified. That person can then take corrective action by remote control. The monitored device typically can be power cycled or rebooted as necessary. In this way, a single administrator can remotely manage numerous servers and other devices simultaneously, saving on the overall operating cost of the network and helping to ensure its reliability.

Typically, a motherboard (or other main circuit board) is made by one manufacturer, while the BMC hardware is made by a different manufacturer and the BMC software is written by a provider other than the maker of the motherboard or BMC. As a result, most often a BMC is a generic hardware device (e.g., an ARM-based system on a chip or "SoC") that is configured relatively statically prior to being installed on a motherboard and usually having limited functionality that is not particularly customized to the particular end system in which the motherboard or other main circuit board is embodied.

BRIEF DESCRIPTION OF THE DRAWINGS

Various embodiments of the invention are disclosed in the following detailed description and the accompanying drawings.

FIG. 5A is a flow diagram illustrating an embodiment of a process to determine an expected device tree and configuration.

FIG. 5B is a flow diagram illustrating an embodiment of an iterative process to generate and refine a device tree.

DETAILED DESCRIPTION

Figure 1:
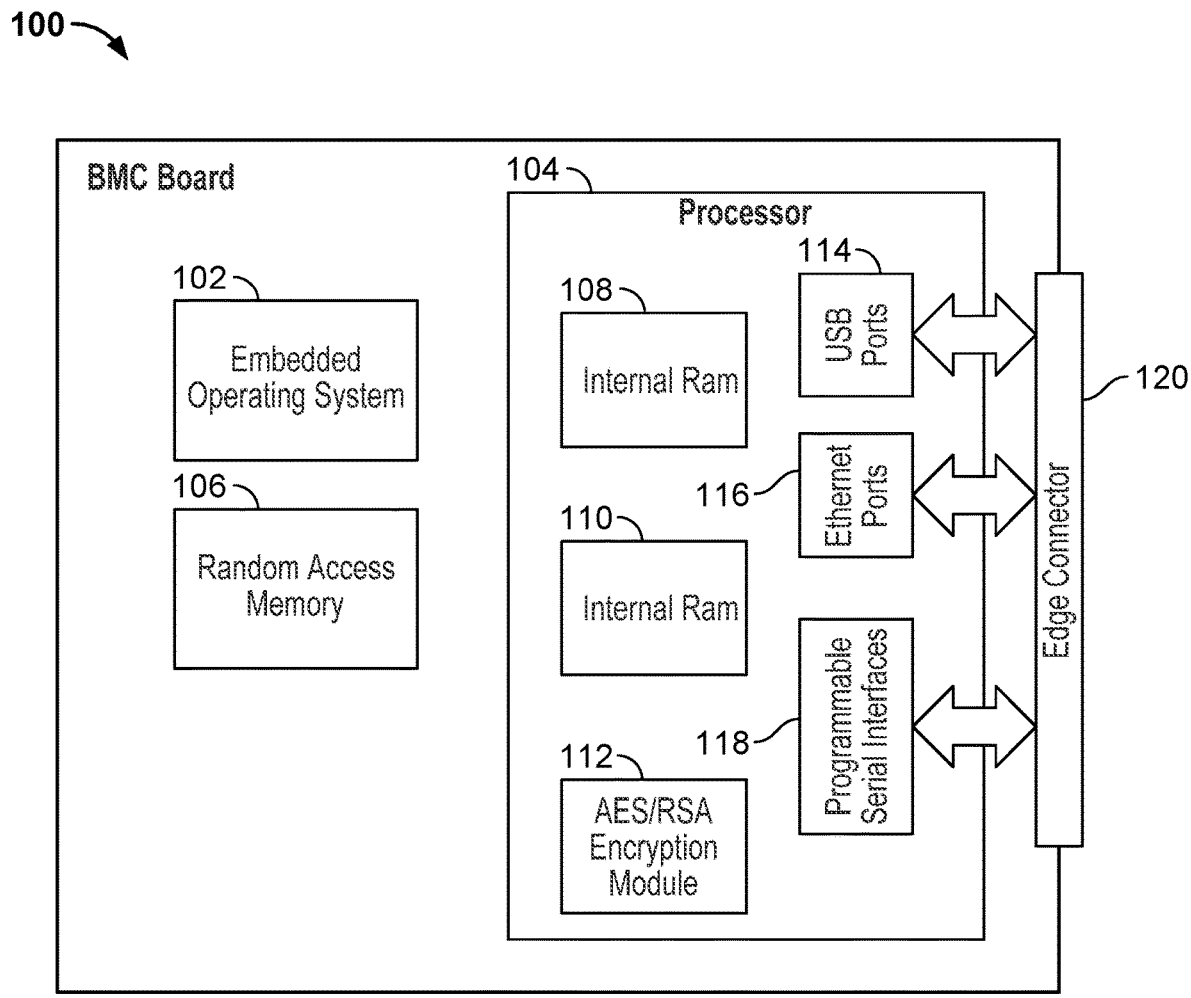
FIG. 1 is a block diagram illustrating an embodiment of a baseboard management controller (BMC).

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to provide a "universal" BMC. In various embodiments, a BMC as disclosed herein is configured to discover and adapt itself to a particular system or other context in which it has been installed and activated. For example, in various embodiments a BMC as disclosed herein may be installed in a motherboard or other main circuit board, such as by being inserted into an edge connector or other connector on the main board.

For clarity and simplicity, in this description, references to a "motherboard" on which a BMC as disclosed herein has been deployed include and refer as well to other types of circuit board on which a BMC as disclosed herein may be deployed, including without limitation any motherboard, baseboard, or other main or other circuit board.

The BMC may itself be a small circuit board on which a "system on a chip" (SoC) or other processor, an embedded operating system, one or more memory chips, an encryption module, communication interfaces, and/or other hardware components and/or functional modules are disposed and/or installed.

In various embodiments, a BMC as disclosed herein may have stored thereon and/or may retrieve upon being booted a device driver library that includes a superset of device drivers, firmware, and/or other software that may be needed to provision and configure programmable elements comprising and/or connected to the motherboard (or other main board). In various embodiments, by providing a universal binary (programming for super set of all possible components), a BMC as disclosed herein can load firmware for the specific devices it discovers across the whole system. This facilitates such capabilities as motherboard components can be easily swapped out, e.g., changing an Ethernet interface.

In various embodiments, at boot (startup) of the BMC in a new (or changed) context, the BMC performs a discovery process to determine the context in which it is operating. The BMC generates a device tree for its environment, and uses the determined context and device tree to select and use appropriate device drivers from its library to provision and configure the programmable elements.

In various embodiments, the JTAG interface is used to discover the core programmable components of the system. This initializes the building of the device tree. From that point the entire "footprint" of the design is known, enabling the BMC to complete initial and subsequent programming of the entire product. The JTAG interface is used to scan and report on the hardware configuration of a motherboard. As such, the BMC has a connection to access the JTAG interface. Because this interface can also be used to compromise the system, they are often disabled or only accessible with special test probes in prior systems. In some embodiments, a connector to a BMC as disclosed herein is the only interface for the JTAG interface. The JTAG interface provides a convenient interface for manufacturing use, and because the BMC is an active JTAG component, it can detect JTAG hacking. The JTAG interface is not physically accessible in the final product, in various embodiments, and as such the interface can be used after the motherboard has left manufacturing without compromising security of the system.

Examples of programmable elements that may be configured by a BMC as disclosed herein include, without limitation, the following: programmable power controllers, I/O expanders, FPGA's, LED displays, network interfaces, fan controllers, and encryption modules.

In various embodiments, a BMC as disclosed herein performs hardware and software management operations and functions beyond the out-of-band management function typically performed by a BMC, including in various embodiments and without limitation one or more of stimulating, provisioning, configuring, programming, testing, monitoring, and re-programming hardware and/or software components, devices, and subsystems; isolating failed components, devices, and subsystems; and forcing hardware and software components, devices, and subsystems to fail in a recoverable manner.

In various embodiments, a system equipped with a BMC as disclosed herein, whether in the field, in soak test, or during initial manufacturing and assembly, can be put through a quality assurance procedure that provide either assurance or audit. This technique can be done in partial assembly or final assembly and different software or sub sections of software can be used based on stages of assembly. This function can be used in situ at an end user site to aid "known good" hardware, or function of the whole mechanism. It can be used to audit of "what" and "what state" something is in periodically and during events like customer service requests to aid in debugging hardware. A BMC as disclosed herein enables the above-described functions to be performed using a component that travels in situ, i.e., on the motherboard, and has many uses over its lifetime and is isolated from main processing so dilution of core function and security are encapsulated.

FIG. 1 is a block diagram illustrating an embodiment of a baseboard management controller (BMC). In the example shown, BMC 100 includes an embedded operating system 102, e.g., a customized LINUX operating system, running on a processor 104. The BMC 100 in this example further includes random access memory 106, e.g., on or more random access memory chips disposed on the same circuit board as processor 106.

In the example shown, processor 106 includes internal random access memory (RAM) 108 and internal read-only memory (ROM) 110. In addition, processor 106 includes an AES/RSA encryption module 112. Further, processor 106 includes communication interfaces, including USB ports 114, Ethernet ports 116, and programmable serial interfaces 118, each configured to provide communication/connectivity via physical connections comprising edge connector 120. In various embodiments, BMC 100 may be installed on a motherboard by inserting edge connector 120 into a corresponding socket or receptacle on the motherboard, thereby establishing a physical conductive path between the respective pins/pads comprising edge connector 120 and corresponding traces on the motherboard.

In various embodiments, BMC 100 initially has no operating system. The processor 106, through an embedded bootstrap program, loads embedded operating system 102 via the edge connector 120. Additionally, in various embodiments, a library of device drivers is loaded. In various embodiments, the library comprises device drivers for a super set of all possible devices that can be connected to the BMC 100.

The BMC 100 (using processor 106) also programs the communications interfaces 114, 116, and 118. The programmable serial interface 118 may include several interfaces. A combination of these interfaces (e.g. I2C and/or JTAG) is used, in various embodiments, to get the initial device list from components connected to BMC 100, e.g., components comprising and/or connected via external connection to a motherboard on which the BMC 100 has been installed.

In some embodiments, the serial interface 118 is attached via a physical trace or connection to which edge connector 120 provides physical connectivity is a hardware device that can provide the board type and revision level of the motherboard, such as a memory device on the motherboard on which such information has been installed by a technician prior to insertion of the BMC 100. In some embodiments, such type and revision information is available on the motherboard and all subsystem boards. In such embodiments, the BMC 100 reads the type and revision information and uses this information to generate the device tree. Additional steps may be performed to refine the device tree. The BMC 100 uses the device tree to select, install, and configure the correct device driver firmware for each component.

In various embodiments, encryption module 112 may be used to provide one or more of the following:
  i) Secure storage on the BMC 100 (e.g., internal RAM 108 and/or RAM 106).
  ii) Cryptographic credentials (e.g., digital signature)
  iii) Secure digital communication In some embodiments, a universally unique identifier (UUID) is generated at time of manufacture and recorded, e.g., stored in the BMC's memory, in some embodiments as immutable/non-mutable and/or encrypted data. The BMC 100 is configured to map the UUID to a known good device tree that is stored in a secure repository. At any future date, the current device tree can be compared to the known good version using a secure communication link to the repository and the UUID identifier.

Figure 2:
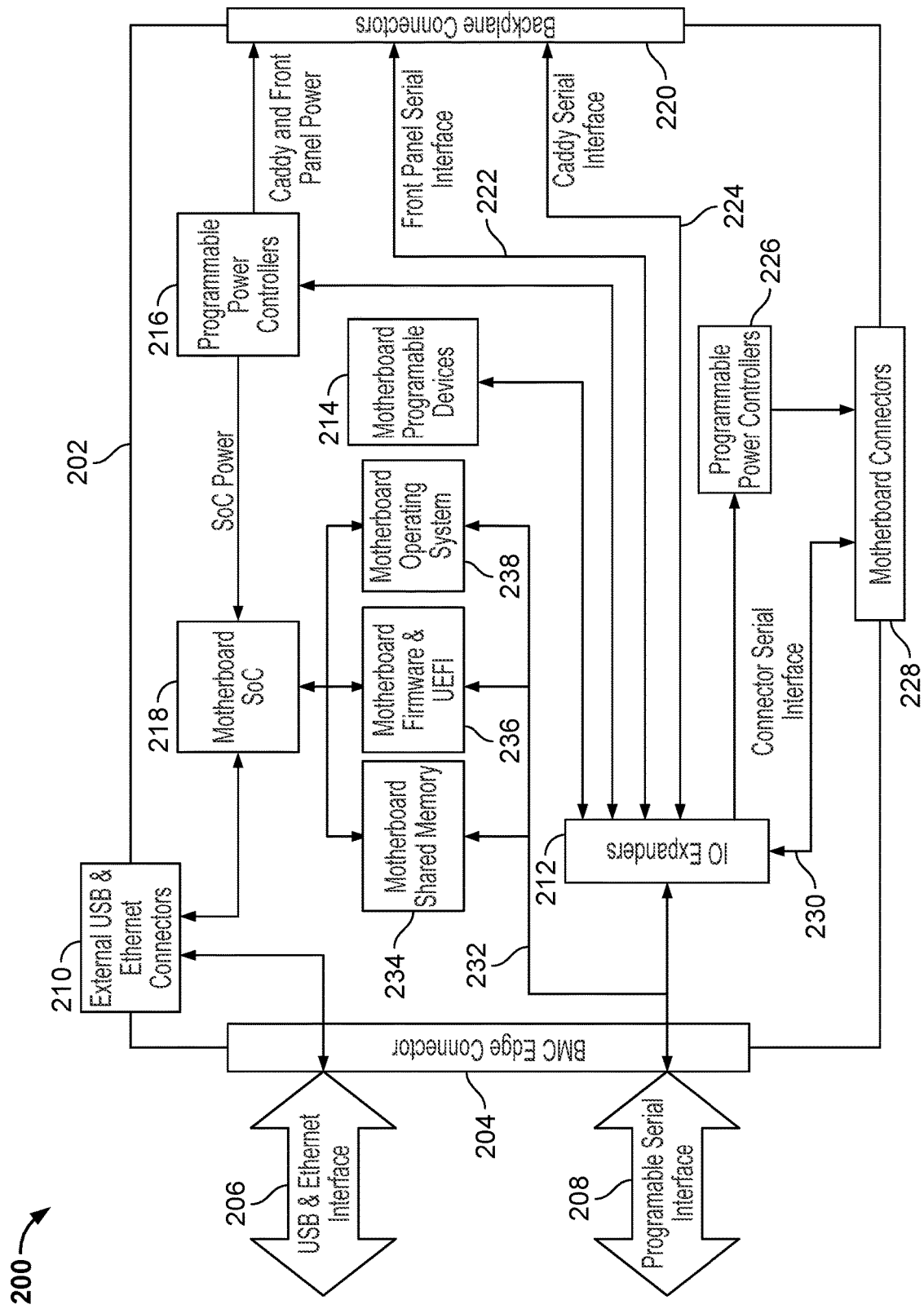
FIG. 2 is a block diagram illustrating an example of a motherboard configured to be managed by an embodiment of a baseboard management controller as disclosed herein.

FIG. 2 is a block diagram illustrating an example of a motherboard configured to be managed by an embodiment of a baseboard management controller as disclosed herein. The motherboard 200 of FIG. 2 is configured to receive and become connected to a BMC as disclosed herein, such as BMC 100 of FIG. 1, via edge connector 204, such as edge connector 120 in the example shown in FIG. 1. In FIG. 2, the motherboard 200 includes a printed circuit board 202 on which a receiving (female) portion of edge connector 204 is affixed and configured to receive an inserted BMC edge connector, such as edge connector 120 of FIG. 1. In some alternative embodiments, the male part of the edge connector is on the motherboard and the BMC includes the female part. In various embodiments, any permanent or non-permanent connector/connection may be used.

In the example shown, BMC USB & Ethernet interfaces 206 correspond to USB ports 114 and Ethernet ports 116 of FIG. 1, and programmable serial interface 208 corresponds to programmable serial interface 118 of FIG. 1.

The Ethernet interfaces 206 of the BMC (not shown in FIG. 2, but connected via the Edge Connector 204, when installed) are connected by traces on printed circuit board 202 directly to external USB & Ethernet connectors 210. This configuration enables the BMC (not shown) to be connected to and powered by USB even if the motherboard 200 is not complete and/or not fully operational or fully and/or properly functioning. In various embodiments, the BMC uses network communications sent via the USB & Ethernet interface 206, BMC edge connector 204, and external USB & Ethernet connectors 210 to load and/or update one or both of the BMC's embedded operating system, such as embedded operating system 102 of FIG. 1, and the device driver library described above.

Most systems connect the USB connector directly to a USB controller. As such the USB function is controlled by the connector. This limits the USB interface functionality to that provided by the controller. In the case of a BMC as disclosed herein, in various embodiments, the USB functionality is provided by a software interface. As such it can be used for various functions. This includes allowing the SoC to be booted from an external drive instead of the local system.

The standard operating system for the motherboard SoC can be configured to boot from a USB connected memory device. The BMC can be configured such that it would masquerade as such a USB device to this would allow boot sequences to be loaded from externally connected devices, either locally or remotely using secure network connections.

In various embodiments, a BMC as disclosed herein connects via programmable serial interface 208 and BMC edge connector 204 to a set of input/output (IO) expanders 212 on the motherboard 200. The BMC configures the IP expanders 212 as needed to use each of at least a subset of physical connections comprising edge connector 204 for multiple communications purposes and/or protocols, such as to provide onboard and off-board sub-channels. The onboard channels in various embodiments connect to all programmable devices on or off the board, such as programmable devices 214 in the example shown in FIG. 2, and the programmable power controllers 216, 226. The off-board channels, in the example shown in FIG. 2, provide communication with and/or control over off-board subsystems and/or components connected to the backplane connectors 220 (via front panel serial interface 222 and caddy serial interface 224, for example) or to the motherboard connectors 228 (via connector serial interface 230).

In the example shown in FIG. 2, the programmable serial interface 208 also provides the BMC with direct access through interface/link 232 to the motherboard shared memory 234, motherboard firmware and Unified Extensible Firmware Interface (UEFI) 236, and motherboard operating system 238.

Figure 3:
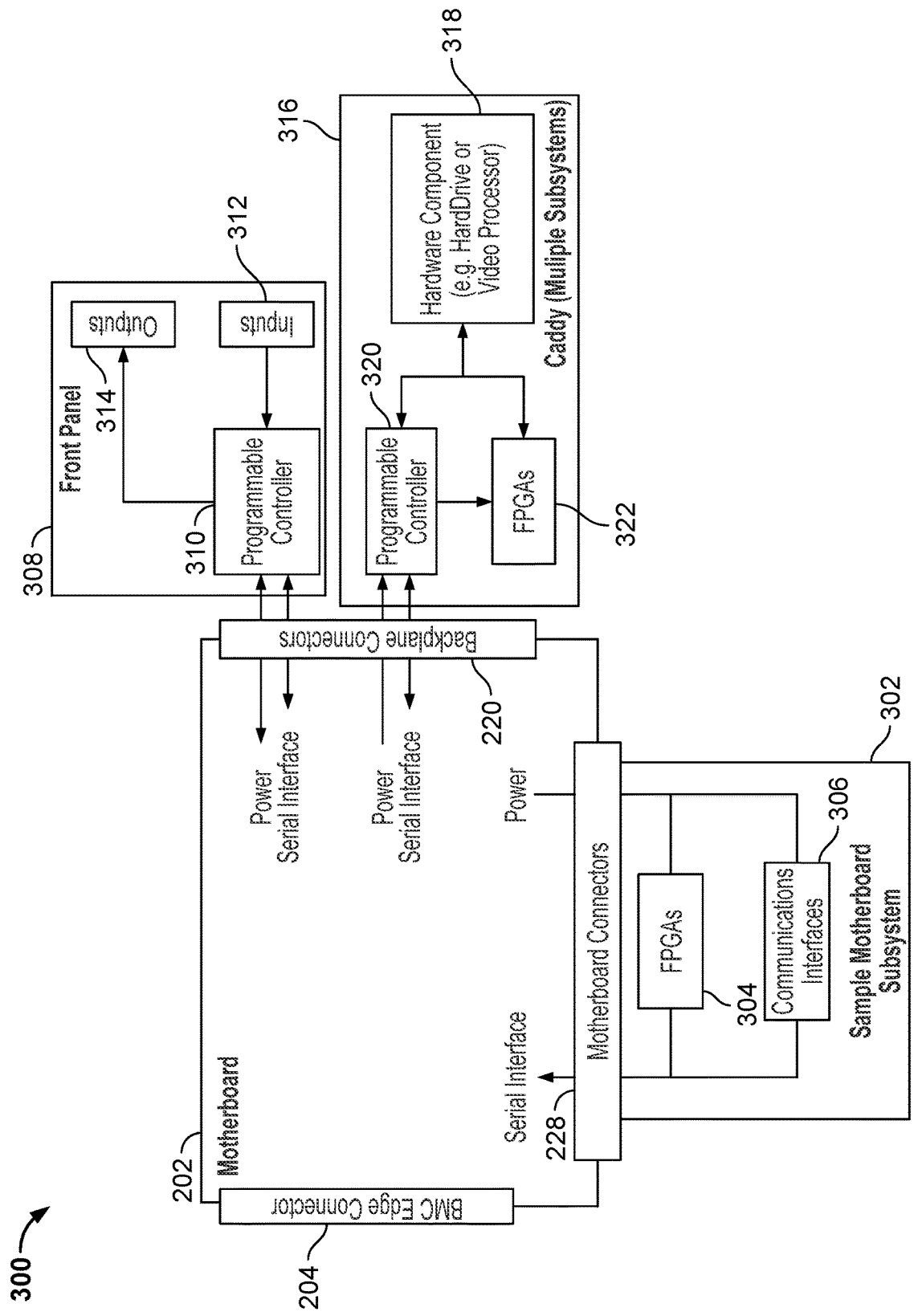
FIG. 3 is a block diagram illustrating examples of sample subsystems such as may be connected to a motherboard configured to be managed by an embodiment of a baseboard management controller as disclosed herein.

FIG. 3 is a block diagram illustrating examples of sample subsystems such as may be connected to a motherboard configured to be managed by an embodiment of a baseboard management controller as disclosed herein.

In the example shown, assembly 300 includes motherboard 202 of FIG. 2 with a sample motherboard subsystem 302 connected via motherboard connectors 228. The sample motherboard subsystem 302 includes one or more field programmable gate array (FPGA) devices 304 and associated communication interfaces 306. The sample motherboard subsystem 302 communicates with devices and components on the motherboard 202 (and via the motherboard with a BMC, not shown in FIG. 2, connected to BMC edge connector 204) through a serial interface to which it is connected via motherboard connectors 228. The sample motherboard subsystem 302 derives power from the motherboard 202 via the motherboard connectors 228, as shown.

In addition, a front panel 308 is connected to motherboard 202 via backplane connectors 220. In the example shown, front panel 308 includes a programmable controller 310 and associated inputs 312 and outputs 314.

Finally, one or more subsystems may be connected via caddy 316 and backplane connectors 220. In the example shown, caddy 316 includes a hardware component 318 (e.g., hard drive, video processor), a programmable controller 320, and FPGAs 322.

In various embodiments, a BMC as disclosed herein may be configured to program programmable elements of motherboard-connected subsystems, such as subsystems 302, 308, and 316 in the example shown in FIG. 3, via communications sent directly and/or indirectly via on or more of BMC edge connector 204, motherboard 202, and backplane connectors 220 and/or motherboard connectors 228.

In various embodiments, a BMC as disclosed herein may discover the identity (e.g., subsystem type, make, model, version, etc.) of each subsystem (component, device, etc.) attached to a motherboard via an external connector. The BMC may use the identity to determine a type and revision associated with the motherboard 202 and the system into which it has been integrated, and to obtain, install, configure, and use device drivers and/or other software (e.g., device firmware) as required for the system as identify and/or classified.

In various embodiments, as in the examples shown in FIGS. 1, 2, and 3, the only connection to the motherboard from the BMC is the edge connector 120, 204. As such all connectivity to the BMC is done through virtual physical connections via the motherboard to the outside world. This removes any physical placement limitations of the BMC in the system and also connectivity of physical interfaces. The BMC design can be universal as the single edge connector is now the only constraint.

While in the examples shown in FIGS. 1, 2, and 3 a BMC as disclosed herein is connected to a motherboard via an edge connector 120, 204, in various embodiments a BMC as disclosed herein is installed on the motherboard in a fixed manner, e.g., soldered in place.

In various embodiments, a BMC as disclosed herein has a software defined interface to the front panel 308. As such, it can create a multitude of input/outputs and displays. These can be adjusted for various products and operating modes. In various embodiments, the BMC also controls the power levels of the system and can allow certain peripherals (including front panel components) to be powered when the main system functions are powered down. This may be used to send alerts, locally or remotely, when a system is powered down, for example.

Figure 4:
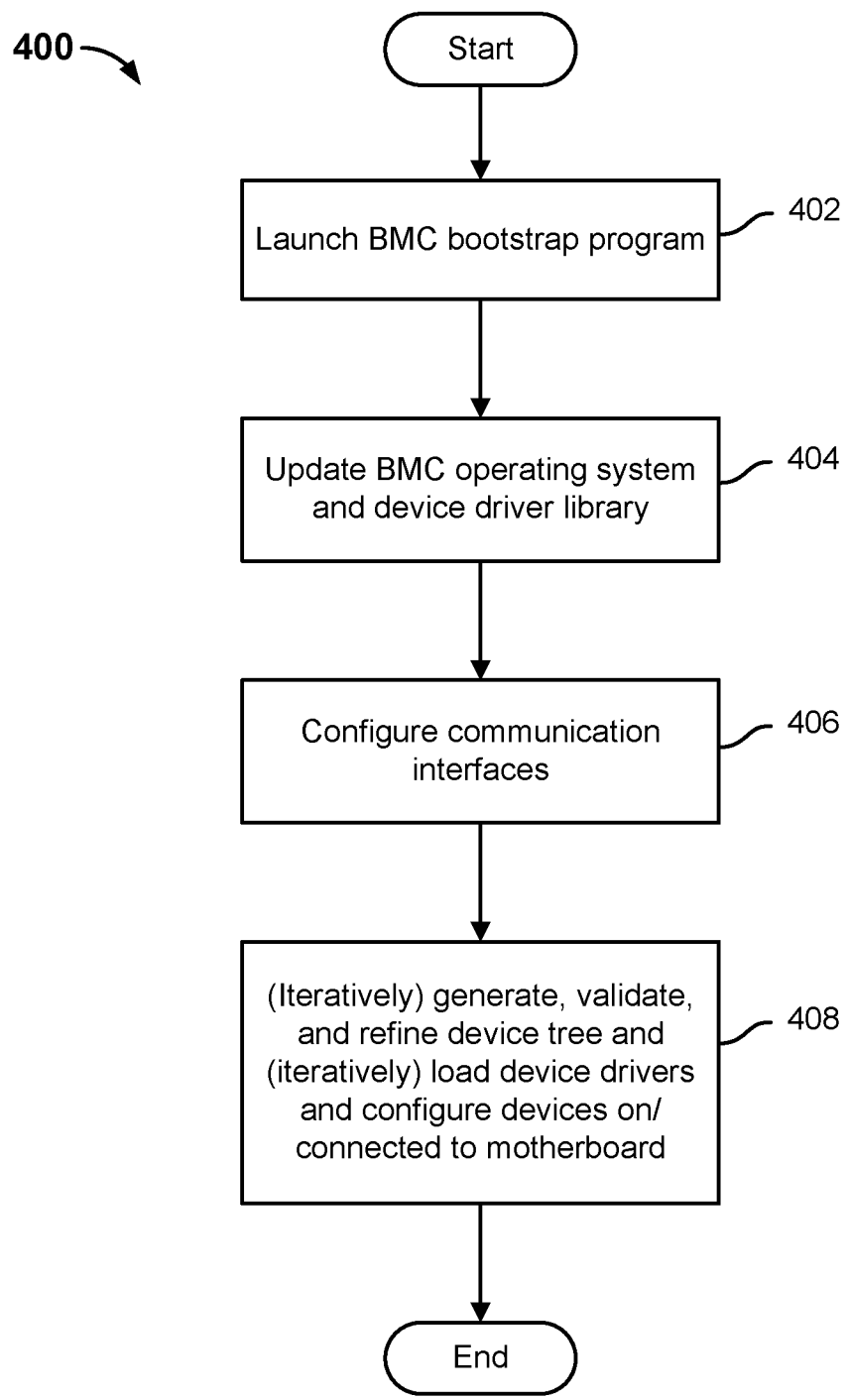
FIG. 4 is a flow diagram illustrating an embodiment of a process to start up and configure a baseboard management controller.

FIG. 4 is a flow diagram illustrating an embodiment of a process to start up and configure a baseboard management controller. In various embodiments, the process 400 of FIG. 4 is performed by a BMC as disclosed herein. For example, the process 400 may be performed by software running on a microcontroller or other processor comprising the BMC. In the example shown, at 402 the BMC bootstrap program is launched. At 404, the bootstrap program updates and/or installs the BMC's embedded operating system and updates and/or retrieves the device driver library. At 406, the BMC's communications interfaces are configured. For example, the USB ports 114, Ethernet ports 116, and programmable serial interfaces 118 in the example shown in FIG. 1 may be configured. Further, communications interfaces on the motherboard, if present may be configured. For example, IO expanders 212 in the example shown on FIG. 2 may be configured to enable the BMC to access devices, components, and sub-systems on and/or connected via external connectors to the motherboard.

At 408, the BMC generates, validates, and refines the device tree, and loads and programs device drivers, firmware, and other software as needed to configure and access devices, components, and sub-systems on and/or connected via external connectors to the motherboard. In various embodiments, the BMC generates, validates, and refines the device tree at least in part by reading a memory location on the motherboard and/or on one or more of the devices, components, and sub-systems on and/or connected via external connectors to the motherboard to read a system/device identifier and version number.

External sub-assemblies may be connected directly to the motherboard via connecters. Subassemblies connected via the motherboard connectors typically are intended to be permanent and are only removed for replacement. In various embodiments, a backplane connector is used for subassemblies that can be easily interchanged as required (referred to as caddies). In various embodiments, the BMC programmable serial interface is extended out to the programmable devices on the subassembly boards. Power is derived from the power controller connected to the BMC. As mentioned earlier, each subassembly may contain a shift register, EEPROM or other memory/storage used to store data explicitly identifying the subassembly.

In some embodiments, the BMC performs iteratively a phased process of discovery and configuration of devices, components, and sub-systems on and/or connected via external connectors to the motherboard. In each phase, the BMC discovers and configures a set of devices, components, and sub-systems discovered in that phase. The BMC then checks to determine if the devices, components, and sub-systems configured to that point provide access to discover and configure further devices, components, and sub-systems. If so, the BMC performs a further iteration of discovery and configuration. The BMC continues to perform iterations of discovery and configuration until no further devices, components, and sub-systems are found.

FIG. 5A is a flow diagram illustrating an embodiment of a process to determine an expected device tree and configuration. In various embodiments, the process of FIG. 5A is performed by a BMC as disclosed herein. For example, the process may be performed by software running on a microcontroller or other processor comprising the BMC. In the example shown, at 502 the BMC listens passively on at least a subset of pins, pads, or other physical connectors by which the BMC is connected to physical traces and/or other conductive paths and/or structures of the motherboard on which it has been installed. At 504, the BMC maps the pattern of high (signal present) and low (no signal present) values to a corresponding board/system type and, in some embodiments, one or more of a sub-type and version. For example, in an embodiment in which the BMC listens on six pins or pads, based on the presence ("1") or not ("0") of a signal on respective locations, the BMC may construct a binary value, such as 0 1 1 0 1 0, and determine based on the value, e.g., by performing a lookup using the value as a key, one or more of the system type, sub-type, and version. For example, a value of 0 1 1 0 1 0, as in the foregoing example, may map to a motherboard for a web server, while a different value, such as 0 1 0 1 0 0, may map to a storage system motherboard. In some embodiments, if at 504 a system type (or at least information sufficient to safely probe the motherboard or other baseboard more actively) cannot be determined, the BMC does not boot or explore any further, to avoid damaging any components comprising the motherboard.

At 506, the BMC reads a board (e.g., motherboard) identifier information (e.g., motherboard and/or end use system type and revision number) for a storage device and/or location on the motherboard. For example, the identifier information may be read from a memory device (e.g., EEPROM) or other memory location on the motherboard that is accessible to and by the BMC once installed, e.g., inserted into a BMC edge connector as described above. The location and/or manner of reading the information may be determined at least in part by the mapping performed at 504.

If at 508 it is determined that the identifier is not present in the expected location on the motherboard, the BMC enters an error condition and state at 510. If the motherboard identifier and version information is read successfully (508), then at 512 the identifier is used to determine an expected device tree and configuration for the motherboard/system.

Once the board type and revision have been determined, actions can be performed that are appropriate to initial programming or configuration.

FIG. 5B is a flow diagram illustrating an embodiment of an iterative process to generate and refine a device tree. In various embodiments, the process of FIG. 5B is performed by a BMC as disclosed herein, e.g., once the motherboard type and version have been determined, e.g., via the process of FIG. 5A. The process of FIG. 5B may be performed by software running on a microcontroller or other processor comprising the BMC. In the example shown, a first phase of device discovery is performed at 522. At 524, a device tree is generated and/or refined. If there are no further devices (or components, sub-systems, etc.) to be discovered (526), the process ends. However, if further devices (or components, sub-systems, etc.) remain to be discovered (526), at 528 the BMC determines and prepares to perform a next phase of discovery at a next iteration of step 522. For example, at 528 the BMC may perform one or more lookups, or determine based on an algorithm or other logic, to determine based on what has been discovered up to that point which locations and/or signals to check for and/or which prompts or communications to send to discover or attempt to discover a further set of devices, components, and/or sub-systems.

The process of FIG. 5B, once completed, produces a complete and refined device tree. In various embodiments, the device tree generated by the process of FIG. 5B may be compared to an expected device tree, e.g., one determine in step 512 of the process of FIG. 5A, to detect any deviation from the expected device tree. In various embodiments, a deviation may indicate a security event (e.g., hacking, unexpected physical removal of a sub-system); a failure event; a hardware/software replacement, upgrade, or similar change event; or that the board is in a partial state of assembly.

In various embodiments, shift registers are used by a BMC as disclosed herein to allow a finite number of connections in a bus topology to connect to a very large number of GPIO pins. "IO expanders" are used, as disclosed herein, to make generic trees of peripherals if cascaded in trunk and leaf configuration. This keeps the connections discoverable and limits the use of previous connections from the BMC, keeping the BMC generic across all supported designs and allowing the BMC to be changed on a connector without specific implementations of BMC per product type. This technique keeps the number of connections and manufacturing cost of PCBs low and/or facilitates quality assurance (QA), in various embodiments.

Once the system "footprint" (e.g., device tree) has been determined, either at boot time or run time, the BMC can scan, audit, re-program, validate and test all aspects of connected hardware. This could be part of management, asset tracking, security or configuration management, in various embodiments.

In various embodiments, once the BMC has defined the system footprint, then UEFI and firmware changes can be made to accommodate the system configuration. Especially if new components are added or ones removed at boot.

Figure 6:
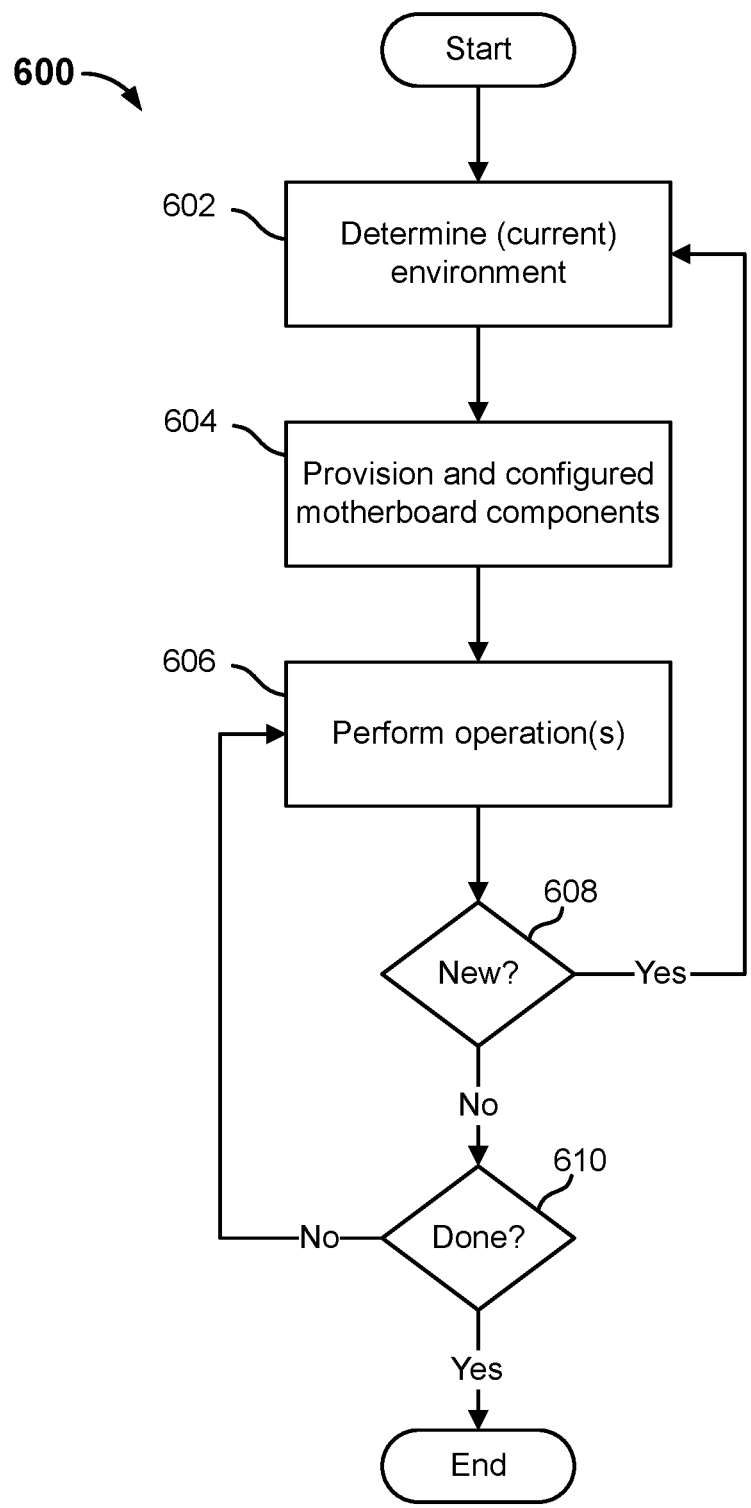
FIG. 6 is a flow diagram illustrating an embodiment of a process to configure programmable motherboard components.

FIG. 6 is a flow diagram illustrating an embodiment of a process to configure programmable motherboard components. In various embodiments, the process 600 of FIG. 6 is performed by a BMC as disclosed herein. For example, the process 600 may be performed by software running on a microcontroller or other processor comprising the BMC. In the example shown, at 602, a current environment in which the BMC is operating is determined. For example, one or more of the processes of FIGS. 4, 5A, and 5B may be performed to identify a board type and revision. At 604, the motherboard and associated devices, components, and sub-systems are provisioned and configured. For example, for each device, component, and sub-system, device driver and/or other software required for the device, component, or sub-system to operate properly in the context of a board of the type, revision, and state (e.g., fully assembled or not, etc.) determined at 602 may be selected from the device driver (and/or other software) library on the BMC and installed and configured. In some embodiments, certain devices (e.g., FPGA) may be programmed in a manner determined at least in part by the board type and revision determined at 602.

At 606, the board performs operations as configured and programmed by the BMC. If a change that requires reconfiguration or other responsive action by the BMC is detected (608), such as device, component, or sub-system being removed, replaced, determined to have been damaged/failed/compromised, etc., the process 600 returns to step 602 and the BMC determines the resulting current context/environment/state and as needed provisions, configures, isolates, powers down, recovers, and/or restores affected and/or new devices, components, and/or sub-systems. If the environment does not change, board operations continue at 606 until the process 600 is done (610), e.g., the board and/or system on which it is installed is powered down.

Figure 7A:
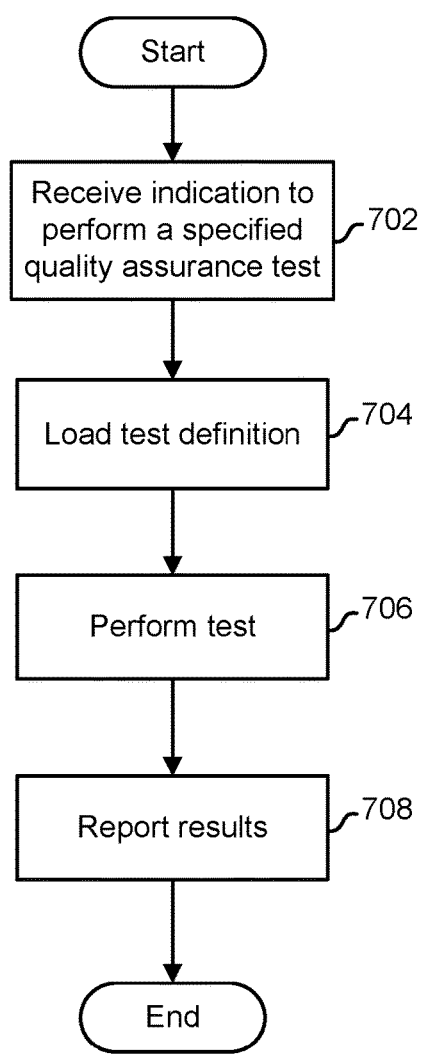
FIG. 7A is a flow diagram illustrating an embodiment of a process to perform a test on a motherboard or component(s) thereof.

FIG. 7A is a flow diagram illustrating an embodiment of a process to perform a test on a motherboard or component(s) thereof. In various embodiments, the process of FIG. 7A is performed by a BMC as disclosed herein. For example, the process may be performed by software running on a microcontroller or other processor comprising the BMC. The process may be performed, for example, to use the BMC to conduct a quality assurance (QA) or other test of a motherboard (or partially assembled motherboard) on which the BMC is installed. In the example shown, at 702, an indication is received (e.g., by the BMC) to perform a specified test. For example, an administrative user may have sent an out-of-band communication to the BMC to prompt the BMC to perform the test. Or, the BMC may be programmed to perform the test upon occurrence of a specific event or condition. At 704, the BMC loads a test definition. For example, a test definition may be loaded from a library of previously-stored test definitions and/or the test definition may be communicated to the BMC from an external source, stored on a component on or connected to the motherboard, etc. At 706, the test is performed and at 708 test results are reported. For example, the BMC may store the test results in a prescribed location on the BMC, on the motherboard, and/or on a sub-system connected to the motherboard, and/or the BMC may communicate the results to an external destination.

In various embodiments, the process of FIG. 7A is performed to test the system on a chip (SoC) and/or other processor(s) on the motherboard, and associated components, before they are programmed. The BMC can then begin the boot programming for the SoC and motherboard once the initial testing has verified the integrity of the manufacturing process (bootstrap from bare copper). This can also be repeated in an installed system. This process can also work in the reverse direction when the SoC can perform the same "bootstrap from copper" on the BMC.

In various embodiments, a BMC as disclosed herein has direct access to programmable components, SoC boot, and firmware memory. As such the BMC can influence individual, or several, boot sequences prior, or during, their execution. This influences configuration before or after individual operations in the boot sequence. For example a single, or multiple, components can be changed multiple times throughout, and independent of, the SoC operation.

Typically, systems have a boot sequence that requires most system components are available before it can execute. Since a BMC as disclosed herein can influence the boot sequence, in various embodiments, it is possible to run the boot process without system components (e.g., bare copper, partially assembled board, etc.). In some embodiments, the BMC can force a jump over POST processes for components that are not installed.

Figure 7B:
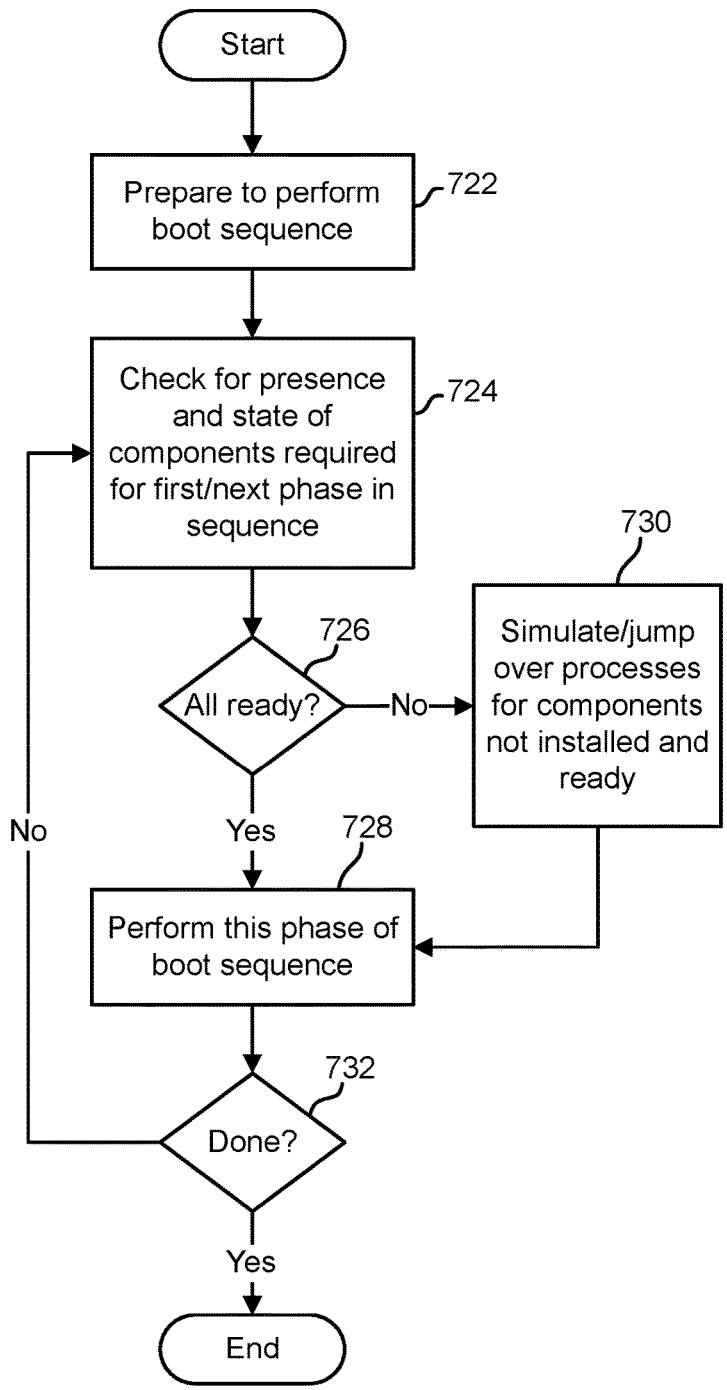
FIG. 7B is a flow diagram illustrating an embodiment of a process to boot a partially completed motherboard.

FIG. 7B is a flow diagram illustrating an embodiment of a process to boot a partially completed motherboard. In various embodiments, the process of FIG. 7B is performed by a BMC as disclosed herein. For example, the process may be performed by software running on a microcontroller or other processor comprising the BMC. In the example shown, at 722, the BMC prepares to perform a boot sequence. At 724, the BMC checks to verify or determine the presence and state of components required to perform the first/next phase in the sequence. If at 726 the BMC determines all required components are ready, at 728 the first/next phase in the boot sequence is performed. If any component(s) required to perform the first/next phase of the boot sequence is determined at 726 to not be ready (not present, not operational, not responsive, etc.), then at 730 for each such component the BMC simulates what that component would normally be expected to do as part of that phase of the boot sequence, and the remainder of boot sequence phase is performed at 728 as normal. The above steps repeat for successive phases of the boot sequence until it has been completed (732), upon which the process of FIG. 7B ends.

Figure 8A:
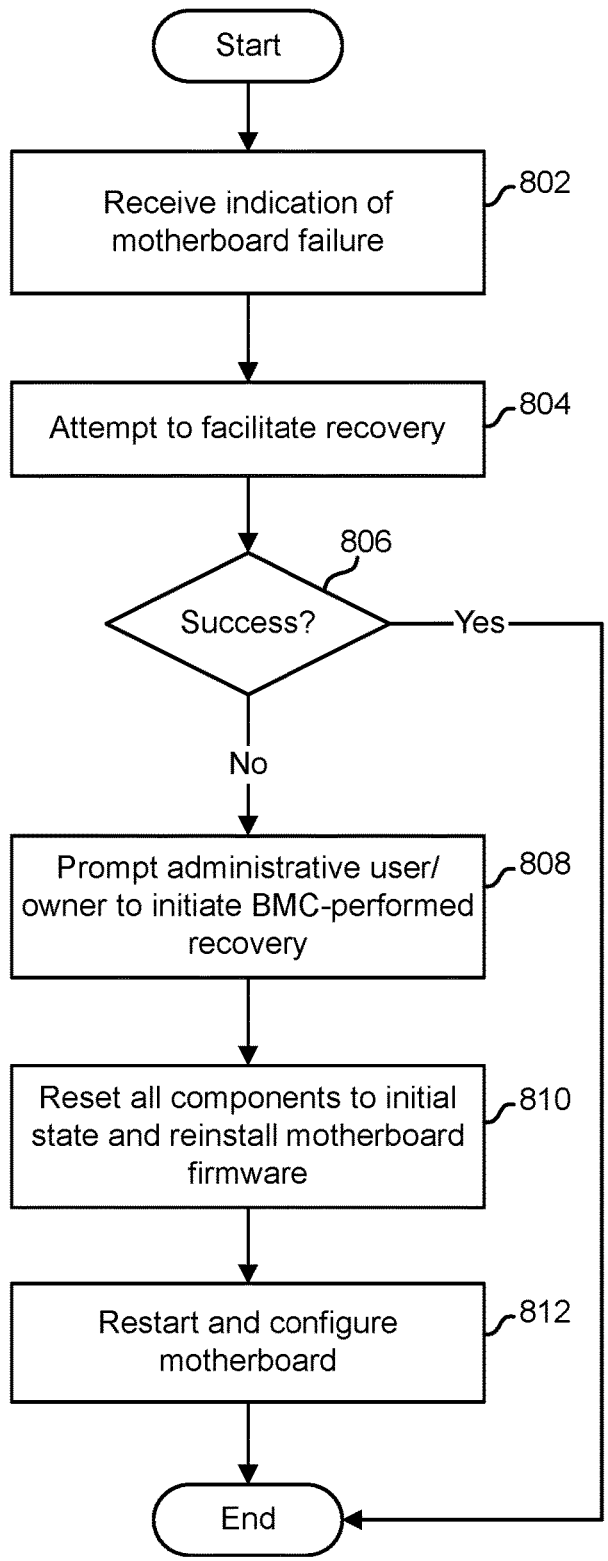
FIG. 8A is a flow diagram illustrating an embodiment of a process to recover a failed and non-responsive motherboard.

FIG. 8A is a flow diagram illustrating an embodiment of a process to recover a failed and non-responsive motherboard. In various embodiments, the process of FIG. 8A is performed by a BMC as disclosed herein. For example, the process may be performed by software running on a microcontroller or other processor comprising the BMC. In the example shown, at 802, an indication is received that a motherboard on which the BMC is installed has experienced a serious failure. At 804, the BMC attempts to facilitate recovery, e.g. by rebooting the motherboard. If the recovery is successful (806), the process ends. If not, at 808 an alert or other notification is sent to an administrative user prompting the user to indicate whether the motherboard has experienced a failure from which the motherboard cannot recover without being hard (e.g., factory) reset by the BMC. If such a recovery is initiated, at 810 the BMC resets all devices, components, and sub-systems of the board to their initial state and restores/recovers the motherboard by reinstalling the motherboard's firmware. For example, the BMC may use a copy of the motherboard firmware stored securely on the BMC to replace a presumptively corrupted instance at the location from which the motherboard reads and executes its firmware.

A System on a Chip (SoC) on a motherboard requires firmware to operate.

Normally the firmware is contained on memory that is only accessible by the motherboard CPU. This makes installation and maintenance of the firmware difficult. In various embodiments, a BMC as disclosed herein has independent access to the SoC firmware. The SoC firmware can cause the system to lockup and fail. This can be done intentionally or non-intentionally. Intentionally can either be by an authorized user (halt the device function to protest against attack) or unauthorized (hacker) to bring down the device. If the SoC software fails, it most likely cannot be received from the host CPU. This causes a non-recoverable, or bricked, system. Since a BMC as disclosed herein is independent of the main CPU, it can recover SoC firmware and restore operationally (un-bricking). Updating SoC firmware during the product life cycle can be difficult (this can also cause bricking). In various embodiments, a BMC as disclosed herein is used to upgrade SoC firmware as needed to facilitate unobtrusive changes in the system.

Since firmware flashing can irrevocably damage a system, having the ability to quickly recover is advantageous. Having a local copy of the firmware in an independent location, such as stored by a BMC as disclosed herein in various embodiments, allows firmware recovery from the maintenance channel. Understanding the history of changes is used for maintenance history as well as security audit. A local independent copy provides a reliable source of the data, plus a validation copy for externally stored data. In current systems firmware is flashed independently. Incompatibilities between versions can cause incorrect operation, often bricking the system. Dependency management can detect, prevent and recover from these errors.

Figure 8B:
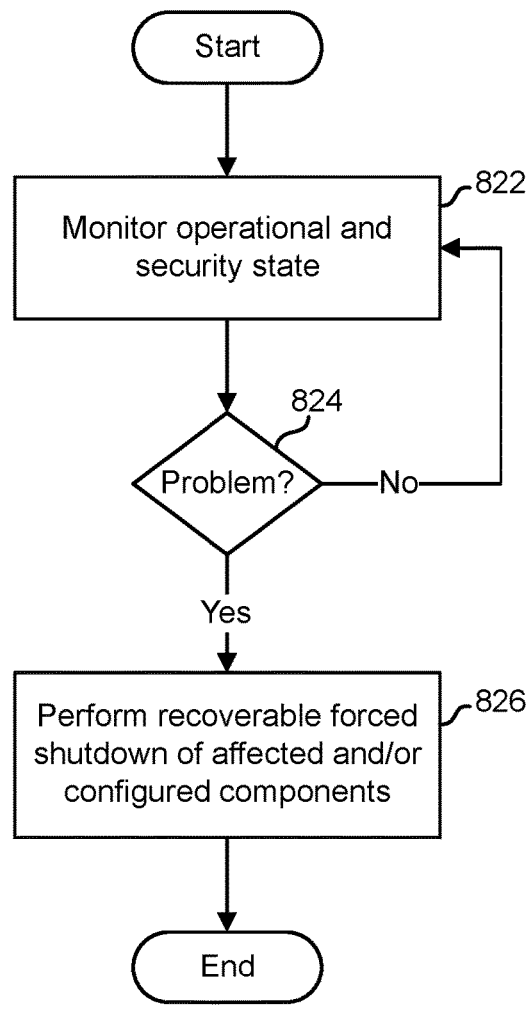
FIG. 8B is a flow diagram illustrating an embodiment of a process to perform a forced full or partial shutdown of a motherboard.

FIG. 8B is a flow diagram illustrating an embodiment of a process to perform a forced full or partial shutdown of a motherboard. In various embodiments, the process of FIG. 8B is performed by a BMC as disclosed herein. For example, the process may be performed by software running on a microcontroller or other processor comprising the BMC. In the example shown, at 822, the operational and/or security state/posture of the system is monitored. At 824, if a problem is detected, such as a hacking event, component failure, etc., then at 826 a recoverable forced shutdown of devices, components, and/or subsystems affected by the problem (e.g., components subject to attack, components not directly affected but desired to be isolated from the problem, etc.) is performed. For example, the BMC may use its connection to and control over programmable power controllers, such as power controllers 216 and/or 226 of FIG. 2, to cut power to a device, component, or subsystem to force the device, component, or subsystem to shut down.

In various embodiments, many of the devices connected to the BMC have power control capabilities e.g. low power mode. These are programmatically controlled via the bus connecting them to the BMC. Alternatively, they are controlled by setting signal levels using the device's external pins. In the latter case a set of IO expanders allows these individual signal levels to be generated from the BMC bus. By controlling the power levels, device firmware and available hardware, different operating hardware configuration can be dynamically created. The creation of different configurations can be created against measured and projected performance.

By monitoring performance, higher power consumption configurations can be created that are only used as the demand requires. The standard approach is to power the system to meet highest performance demand and then waste power at lower performance levels. Reversing the above process will allow the system to be powered down for lower levels of performance.

In various embodiments, performance can be limited by the available power set by the BMC. Since the BMC does have secure communications and storage, licensing can be defined and managed by the BMC to apply power restrictions that affect performance. The BMC can also remove or add power to certain components within the system. This will allow defective components to be powered down. While standby components can be powered up. The BMC can control the power sequencing required to swap out the components as this can be complex. Externally connected components using the caddies can utilize the centrally provided capabilities of the BMC. They do not need to add them as part of the external component.

Figure 9A:
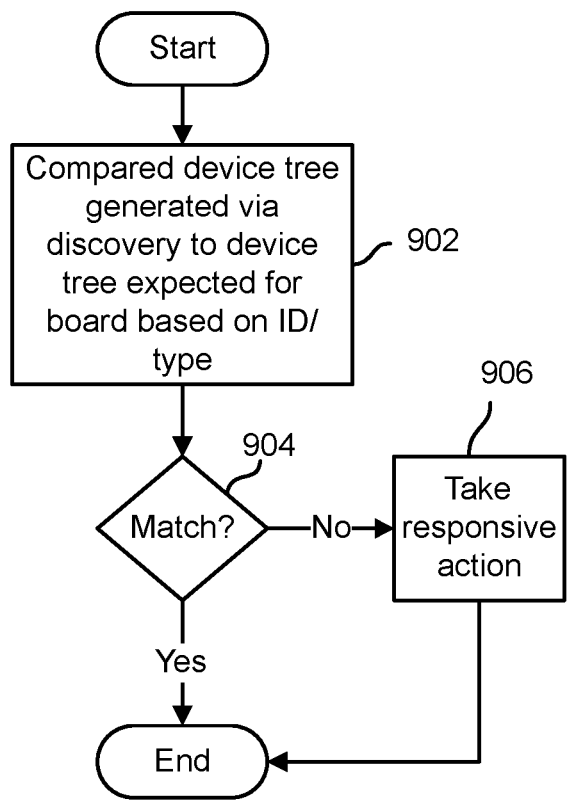
FIG. 9A is a flow diagram illustrating an embodiment of a process to detect and respond to device and/or configuration changes.

FIG. 9A is a flow diagram illustrating an embodiment of a process to detect and respond to device and/or configuration changes. In various embodiments, the process of FIG. 9A is performed by a BMC as disclosed herein. For example, the process may be performed by software running on a microcontroller or other processor comprising the BMC. In the example shown, at 902, a device tree generated (or re-generated) via discovery is compared to an expected device tree for the board, e.g. one determined by prior discovery and/or based on explicitly or implicitly determined board type and revision. If the device trees match (904), the process ends. If the device trees do not match, at 906 the BMC takes responsive action. Examples of responsive action include, without limitation, sending a notification or alert; isolating unrecognized devices, components, and subsystems; and attempting to identify, load drivers for, program, and/or otherwise configure newly-added devices, components, and subsystems.

Figure 9B:
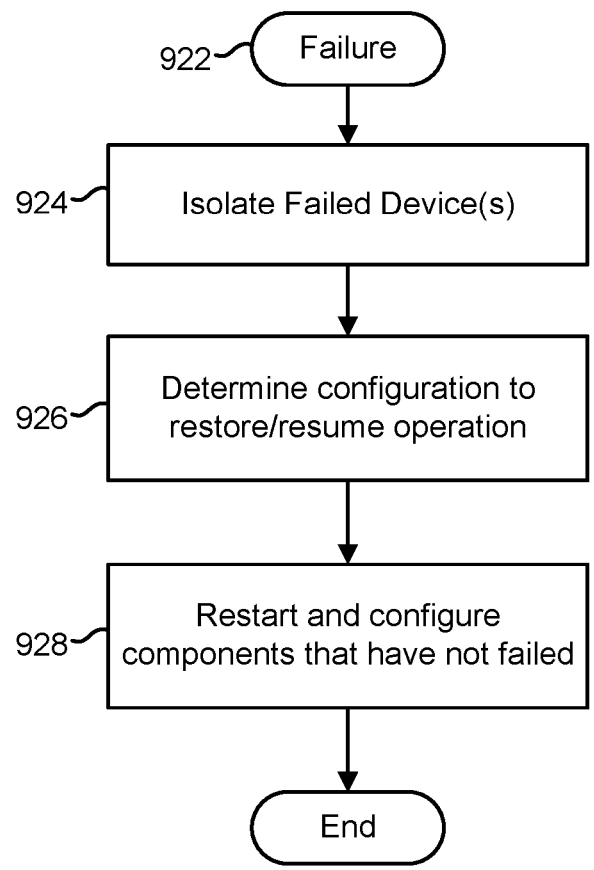
FIG. 9B is a flow diagram illustrating an embodiment of a process to isolate devices and/or components affected by an attack or failure.

FIG. 9B is a flow diagram illustrating an embodiment of a process to isolate devices and/or components affected by an attack or failure. In various embodiments, the process of FIG. 9B is performed by a BMC as disclosed herein. For example, the process may be performed by software running on a microcontroller or other processor comprising the BMC. In the example shown, upon detecting a device, component, and/or subsystem failure, at 922, the BMC isolates the affected device, component, and/or subsystem. For example, the BMC may prevent other devices, components, and/or subsystems from communicating with the affected device, component, and/or subsystem, and/or the BMC may use its control over programmable power controllers on the board to cut off power from the affected device, component, and/or subsystem. At 926, a configuration to restore/resume operation is determined. For example, the BMC may determine whether and if so how the remaining devices, components, and subsystems of the system may be configured and used independently of the device, component, and/or subsystem that has been affected by the failure. At 928, the BMC configures and restarts those devices, components, and subsystems of the system that may be used independently of the device, component, and/or subsystem that has been affected by the failure.

Figure 9C:
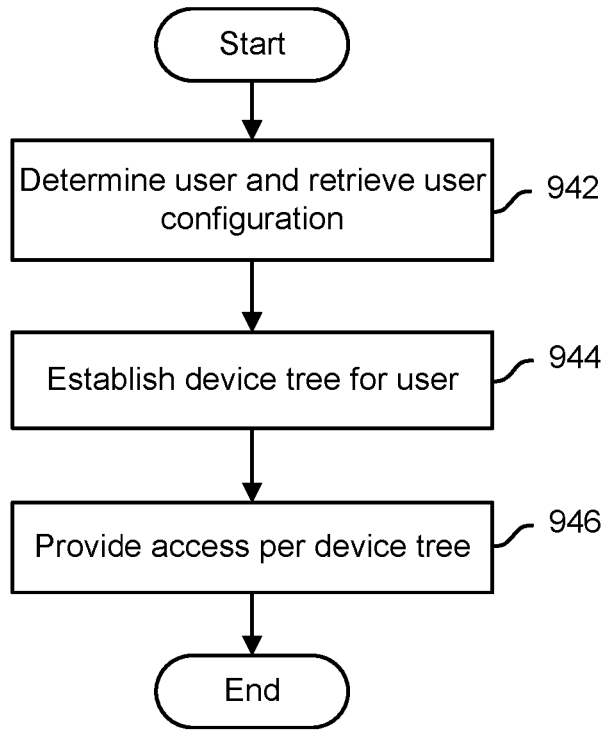
FIG. 9C is a flow diagram illustrating an embodiment of a process to provide user-specific access to motherboard resources.

FIG. 9C is a flow diagram illustrating an embodiment of a process to provide user-specific access to motherboard resources. In various embodiments, the process of FIG. 9C is performed by a BMC as disclosed herein. For example, the process may be performed by software running on a microcontroller or other processor comprising the BMC. In various embodiments, the process of FIG. 9C is performed by a BMC as disclosed herein to provide access to a user-specific space (e.g., user access to devices, components, and subsystems, and/or features and functions thereof), which may be different as between different users, e.g., depending on their role, access privileges, etc.

In the example shown, at 942, a user identity is determined and used to retrieve an associated user configuration data, such as a set of access privileges, a list of devices, etc. to which the user is to be provided access, etc. At 944, a device tree to be used to manage and provide access to the user is generated. The device tree generated at 944 may include only a subset of devices, components, and subsystems of the system. At 946, the device tree generated for the user is used to provide access only to those devices, components, and subsystems, and/or specific functions and features thereof, to which the user configuration data retrieved at 942 indicated the user is to be provided access.

In various embodiments, a BMC as disclosed herein has self-contained cryptographic functions that are independent of the rest of the system. As such, cryptographic services can be implemented solely in the BMC. This can include, but is not limited to:

i. Creation of security credentials that are unique to BMC e.g. GUIDs r embedded Cryptographic keys.
 ii. Establish secure communication (confidentiality and integrity), using these credentials, to an authenticated external destination.
 iii. Create a crypto locker in the BMC environment to store sensitive information
 iv. Provide integrity services such as cryptographic signing
 v. Crypto wipe: destroying any security credentials to render encrypted data unusable.
 vi. Crypto wipe: destroying any security credentials to render encrypted data unusable.

In various embodiments, a BMC as disclosed herein may be used as a cryptographic locker. Often the keys in a cryptographic transaction are the hardware part of a protocol or crypto scheme to protect. The value of the protocol or crypto being public is low to an attacker but the keys represent the secret part. If the keys are trivial to access so too is the content intended to be secret. Hard embedding of keys in the BMC internal memory to form a crypto locker where keys never leave will increase the security properties of crypto schemes. As such a processor would send content to the BMC or the BMC would take clear text or content and use the embedded keys to perform crypto operations. Preventing trivial user access to keys in various embodiments provide extra assurance of security properties. Encryption, decryption, signing and other schemes using keys can be used.

Additional security credentials can be added to the BMC to provide secure access to customers. Further, this can be used to provide customer specific configurations. By allocating specific security credentials, the BMC can be used to control and allocate licenses provided by third parties (service providers.)

Building on the concept that the BMC is a key, third party manufacturers can be designated special BMC builds that are uniquely allocated to them. This will allow a prime manufacturer to verify the integrity of a third party designed component and then program it as part of the completed system.

In various embodiments, the BMC can remain un-programmed until a specific step in the manufacturing process. Once that step is reached, the BMC can be "locked".

Running timing synchronization protocols (e.g., PTP) on the BMC would allow stamping and time signing with above on BMC, logs, events, licensing. As such the BMC could provide assurances of events and actions and content in time that is not easily done without access to the keys. An example of this would be the time stamped and signed copy of a file send from the BMC that is provable by the key creator of the embedded key and not necessarily by the sender. For example, a user of the system without access to the BMC embedded keys sends logs files to the creator of the keys with a signed and time stamped message. This is reasonable proof of content at a point in time synchronized with an external source (potentially the key creator but not necessarily).

The BMC can determine the system footprint. It can also create a cryptographic signature of a known good code set. At any time, the BMC can compute a cryptographic signature for operation code and compare it against the stored known good value. This essentially creates a Host Intrusion Detection System (HIDS). Alerts can be sent locally and remotely when a variance is detected.

The above allows the complete manufacturing "bring-up", programming, QA, stimulation for validation test and customization per device class, instance, or customer configuration.

The BMC interface can be secured using cryptographic functions on the BMC hardware. As mentioned earlier the BMC can control the SoC firmware. As such it can deny operation of any motherboard component. This can be used to thwart or prevent hacking attacks. Or disable functions based on licenses.

The BMC has direct control of physical interfaces and also their function. Plus the BMC can provide secure communications. This secure communications solution replaces the use of generalized, unprotected interfaces in the system hardware. Plus the tight integration into the motherboard functionally, ensures that the BMC must be present for the system to operate. This essentially makes the BMC a virtual lock for the system. Furthermore, it can restrict external physical access to prevent unauthorized connections to a product for the purpose of re-program, re-configure items or scan items casually.

The MAC address for the Ethernet connection is normally stored on the Network Interface Device (NIC). If a NIC device fails, then the replacement will have a new MAC address. This will require modifications of the network downstream components. The BMC can query NIC hardware when it is installed and ensure that the MAC address from the previous hardware is maintained. Further, under certain circumstances, a man in the middle attack, the MAC address of the NIC card needs to be changed. The BMC can overwrite the MAC address on the motherboard and change it out of band.

The BMC is in an ideal placement functionally to initiate and monitor load testing. As an independent system, it can monitor the main system components without influencing the results.

CEPH requires many low-level configuration actions when it is installed on a standard system. By adding these components to the BMC they can be pre-installed before the main system boots and the rest of the CEPH system is installed by the CPU Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory configured to store a library comprising a superset of device drivers, the superset including for each of a plurality of supported systems a corresponding set of device drivers for devices comprising that supported system;
   a processor coupled to the memory and configured to:
      determine a context in which the processor is deployed, the context being associated with a specific corresponding one of the plurality of supported systems; and
      use the library to provision based on the determined context at least a subset of devices accessible by the processor in the context in which the processor is deployed; and
   a communication interface coupled to the processor and wherein the processor is configured to communicate, via the communication interface, with said devices accessible by the processor;
   wherein the processor is further configured to configure an input/output (I/O) expander comprising an instance of the specific corresponding one of the plurality of supported systems in which the processor has been deployed to communicate with said devices accessible by the processor.

2. The system of claim 1, wherein the processor is further configured to listen passively on a prescribed set of physical connections comprising the communication interface and to construct a binary value based on the presence or absence of a voltage or other signal on each respective physical connection.

3. The system of claim 2, wherein the processor is further configured to map the constructed binary value to a corresponding type of context.

4. The system of claim 3, wherein the processor is further configured to enter an error state and to not boot any further based at least in part on a determination that the corresponding type of context cannot be determined.

5. The system of claim 3, wherein the processor is further configured to use the corresponding type of context to determine a location from which to read a context type and version identifier information.

6. The system of claim 5, wherein the processor is further configured to use the context type and version identifier information to generate a device tree at least in part by discovering devices by communicating with said discovered devices via the communication interface.

7. The system of claim 6, wherein the processor is configured to discover said devices iteratively, using information obtained in a first iteration to discover further devise in a second iteration of discovery.

8. The system of claim 6, wherein the processor is further configured to compare the generated device tree to an expected device tree associated with the context type and version identifier information.

9. The system of claim 6, wherein the processor is further configured to use the context type and version identifier information to determine for each device in at least a subset of the device tree one or both of a corresponding driver and a corresponding configuration.

10. The system of claim 1, further comprising a communication interface coupled to the processor and wherein the processor is configured to communicate, via the communication interface, with said devices accessible by the processor; the context comprises a motherboard or other main circuit board; and the processor is configured to perform an operational test of the motherboard or other main circuit board.

11. The system of claim 10, wherein the processor is configured to receive and store a test definition associated with the operational test and to use the test definition to perform the operational test.

12. The system of claim 11, wherein the processor is configured to perform the operational test at least in part by communicating, via the communication interface, with one or more of the devices accessible by the processor.

13. The system of claim 12, wherein the processor is configured to determine that a device or subsystem identified in the test definition is not present and to emulate the actions of the missing device or subsystem to enable the operational test to be performed in the absence of the missing device or subsystem.

14. A system, comprising:
a memory configured to store a library comprising a superset of device drivers, the superset including for each of a plurality of supported systems a corresponding set of device drivers for devices comprising that supported system;
a processor coupled to the memory and configured to:
determine a context in which the processor is deployed, the context being associated with a specific corresponding one of the plurality of supported systems; and
use the library to provision based on the determined context at least a subset of devices accessible by the processor in the context in which the processor is deployed;
wherein the context comprises a motherboard or other main circuit board and wherein said subset of devices accessible by the processor includes a memory associated with a firmware of the motherboard or other main circuit board and the processor is further configured to receive an indication that the motherboard or other main circuit board has experienced a failure that the motherboard or other main circuit board is not able to recover from; and to write replacement firmware code to the memory to enable the motherboard or other main circuit board to be restored to operation.

15. A method, comprising:
storing a library comprising a superset of device drivers, the superset including for each of a plurality of supported systems a corresponding set of device drivers for devices comprising that supported system;
determining a context in which a processor is deployed, the context being associated with a specific corresponding one of the plurality of supported systems;
using the library to provision based on the determined context at least a subset of devices accessible by the processor in the context in which the processor is deployed, wherein the processor is coupled to a communication interface and the processor is configured to communicate, via the communication interface, with said devices accessible by the processor; and
configuring an input/output (I/O) expander comprising an instance of the specific corresponding one of the plurality of supported systems in which the processor has been deployed to communicate with said devices accessible by the processor.

16. The method of claim 15, further comprising listening passively on a prescribed set of physical connections comprising a communication interface and constructing a binary value based on the presence or absence of a voltage or other signal on each respective physical connection.

17. A computer program product embodied in a non-transitory computer readable medium and comprising computer instructions for:
storing a library comprising a superset of device drivers, the superset including for each of a plurality of supported systems a corresponding set of device drivers for devices comprising that supported system;
determining a context in which a processor is deployed, the context being associated with a specific corresponding one of the plurality of supported systems;
using the library to provision based on the determined context at least a subset of devices accessible by the processor in the context in which the processor is deployed, wherein the processor is coupled to a communication interface and the processor is configured to communicate, via the communication interface, with said devices accessible by the processor; and
configuring an input/output (I/O) expander comprising an instance of the specific corresponding one of the plurality of supported systems in which the processor has been deployed to communicate with said devices accessible by the processor.

* * * * *